United States Patent
Chiu

(10) Patent No.: US 7,672,529 B2
(45) Date of Patent: Mar. 2, 2010

(54) TECHNIQUES TO DETECT GAUSSIAN NOISE

(75) Inventor: Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1299 days.

(21) Appl. No.: 11/126,569

(22) Filed: May 10, 2005

(65) Prior Publication Data

US 2006/0257043 A1    Nov. 16, 2006

(51) Int. Cl.
*G06K 9/40* (2006.01)
(52) U.S. Cl. .......................... 382/261; 382/275
(58) Field of Classification Search .............. 382/254, 382/260, 261, 274, 275; 348/241; 358/463
See application file for complete search history.

(56) References Cited

U.S. PATENT DOCUMENTS

| 6,031,638 | A  | * | 2/2000 | Rao et al. ................ 358/474 |
| 6,775,840 | B1 | * | 8/2004 | Naegel et al. .............. 725/111 |

* cited by examiner

*Primary Examiner*—Yon Couso
(74) *Attorney, Agent, or Firm*—Kacvinsky LLC

(57) ABSTRACT

A system, apparatus, method and article to filter media signals are described. The apparatus may include a media processor. The media processor may include an image signal processor having multiple processing elements to determine a level of noise for an image using an internal spatial region of said image, select filter parameters based on the level of noise, and filter the image using the filter parameters. Other embodiments are described and claimed.

16 Claims, 8 Drawing Sheets

TECHNIQUES TO DETECT GAUSSIAN NOISE

BACKGROUND

Media processing applications, such as image or video processing, may have a need for one or more filters. For example, an image may undergo several media processing operations that may introduce noise into the image. A filter may be used in an attempt to reduce such noise. Some filtering techniques, however, may generate undesirable results such as blurring or artifacts. Improvements in filtering techniques may reduce these and other undesirable results associated with filtering operations.

DETAILED DESCRIPTION

Some embodiments may be directed to filter techniques for video and image applications suitable for use with video processors, image processors, display processors, media processors, and the like. For example, some embodiments may detect and reduce Gaussian noise in a video, picture or image. Gaussian noise may refer to the additive normal distribution used to model random degradation in an image caused by the imperfect operations of video capturing, transmission and storage. Some embodiments may identify in real time whether an image contains Gaussian noise using information derived from a single image. Some embodiments may further estimate the strength of such Gaussian noise. Detecting the presence and strength of Gaussian noise may be used to filter the Gaussian noise from one or more images. The embodiments are not limited in this context.

Figure 1:
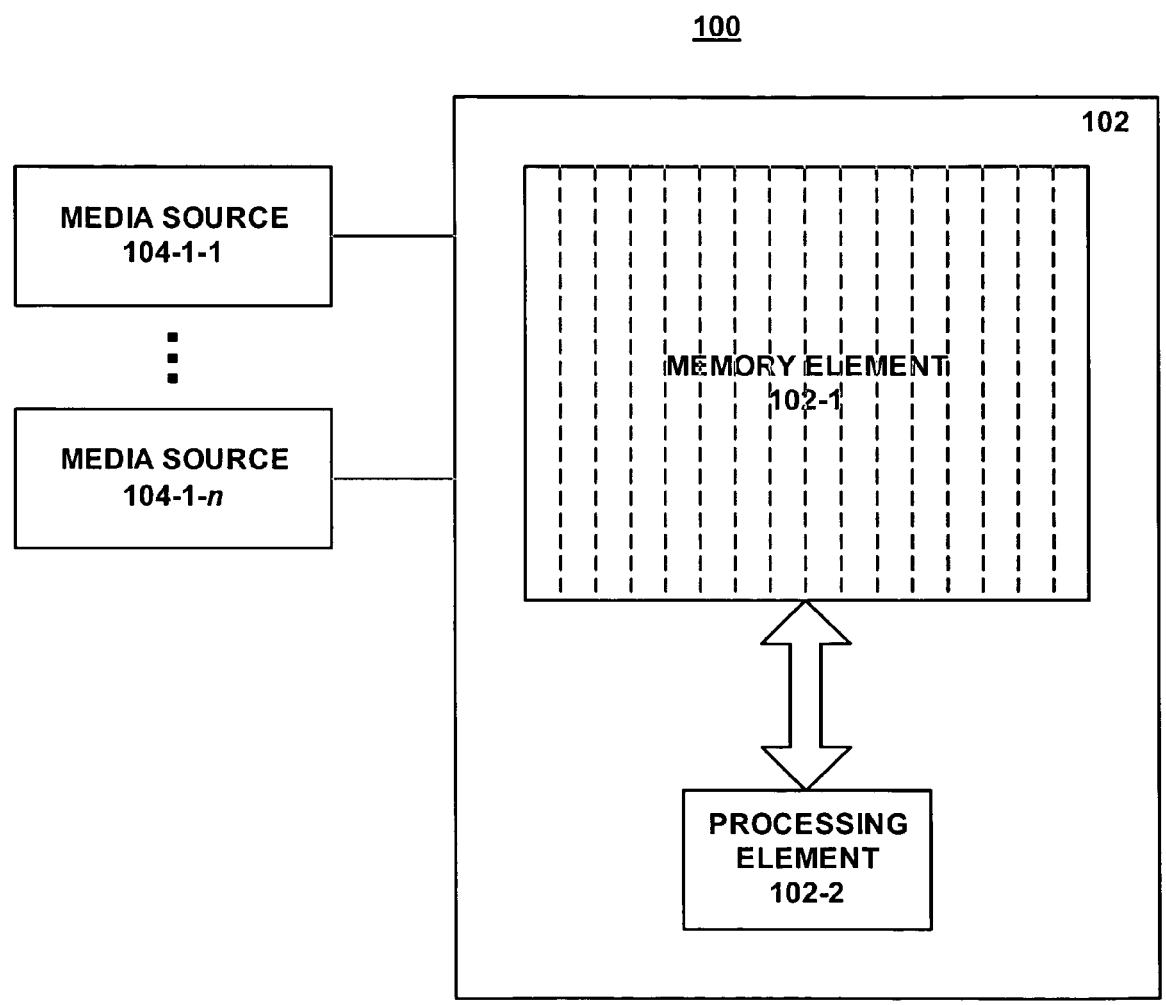
FIG. 1 illustrates one embodiment of a system.

FIG. 1 illustrates a block diagram of a system 100. In one embodiment, for example, the system 100 may comprise a communication system having multiple nodes. A node may comprise any physical or logical entity for communicating information in the system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation. The embodiments are not limited in this context.

In various embodiments, a node may comprise a media processing system, a set top box (STB), a television, a consumer appliance, a processing system, a computer system, a computer sub-system, a computer, a workstation, a terminal, a server, a personal computer (PC), a laptop, an ultra-laptop, a handheld computer, a personal digital assistant (PDA), a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a media processor, and so forth. The embodiments are not limited in this context.

In various embodiments, the nodes of system 100 may communicate, manage, or process information in accordance with one or more protocols. A protocol may comprise a set of predefined rules or instructions for managing communication among nodes. A protocol may be defined by one or more standards as promulgated by a standards organization, such as the Internet Engineering Task Force (IETF), International Telecommunications Union (ITU), the International Organization for Standardization (ISO), the International Electrotechnical Commission (IEC), the Institute of Electrical and Electronics Engineers (IEEE), and so forth. The embodiments are not limited in this context.

As shown in FIG. 1, the system 100 may comprise a media processing node 102. In various embodiments, the media processing node 102 may be arranged to process one or more types of information, such as media information. Media information generally may refer to any data representing content meant for a user, such as image information, video information, graphical information, audio information, voice information, textual information, numerical information, alphanumeric symbols, character symbols, and so forth. The embodiments are not limited in this context.

In various embodiments, media information may comprise image information. Image information may generally refer to any data derived from or associated with one or more static or video images. In one embodiment, for example, image information may comprise one or more pixels derived from or associated with an image, region, object, picture, video, reel, frame, clip, feed, stream, and so forth. The values assigned to pixels may comprise real numbers and/or integer numbers. The embodiments are not limited in this context.

In various embodiments, media processing node 102 may be arranged to process media information received from media source nodes 104-1-$n$, with n representing any positive integer. The media processing node 102 may be connected to one or more media source nodes 104-1-$n$ through one or more wired and/or wireless communications media, as desired for a given implementation.

Media source nodes 104-1-$n$ may comprise any media source capable of delivering media information (e.g., image information, video information, audio information, or audio/video information) to a destination node and/or to an intermediary node, such as media processing node 102. An example of a media source may include a source for video signals, such as from a computer to a display. Other examples of a media source may include a digital camera, A/V camcorder, video surveillance system, teleconferencing system, telephone system, medical and measuring instruments, scanner system, copier system, and other sources needing image and audio processing operations. Another example of a media source may include a source for audio signals. The audio source may be arranged to source or deliver standard audio information, such as analog or digital music. The embodiments are not limited in this context.

Another example of a media source may include a source for audio/video (A/V) signals such as television signals. The media source may be arranged to source or deliver standard analog television signals, digital television signals, high definition television (HDTV) signals, and so forth. The television signals may include various types of information, such as television audio information, television video information, and television control information. The television video information may include content from a video program, computer generated images (CGI), and so forth. The television audio information may include voices, music, sound effects, and so forth. The television control information may be embedded control signals to display the television video and/or audio information, commercial breaks, refresh rates, synchronization signals, and so forth. The embodiments are not limited in this context.

In some embodiments, media source nodes 104-1-$n$ may originate from a number of different devices or networks. For example, media source nodes 104-1-$n$ may include a device arranged to deliver pre-recorded media stored in various formats, such as a Digital Video Disc (DVD) device, a Video Home System (VHS) device, a digital VHS device, a computer, a gaming console, a Compact Disc (CD) player, a scanner, a facsimile machine, a copier machine, and so forth. In yet another example, media source nodes 104-1-$n$ may include media distribution systems to provide broadcast or streaming analog or digital television or audio signals to media processing node 102. Examples of media distribution systems may include, for example, Over The Air (OTA) broadcast systems, terrestrial cable systems (CATV), satellite broadcast systems, and so forth. The types and locations of media source nodes 104-1-$n$ are not limited in this context.

In some embodiments, media source nodes 104-1-$n$ may originate from a server connected to the media processing node 102 through a network. A server may comprise a computer or workstation, such as a web server arranged to deliver Hypertext Markup Language (HTML) or Extensible Markup Language (XML) documents via the Hypertext Transport Protocol (HTTP), for example. A network may comprise any type of data network, such as a network operating in accordance with one or more Internet protocols, such as the Transport Control Protocol (TCP) and Internet Protocol (IP). The embodiments are not limited in this context.

In various embodiments, the media processing node 102 may comprise, or be implemented as, one or more of a media processing system, a media processing sub-system, a media processor, a media computer, a media device, a media encoder, a media decoder, a media coder/decoder (codec), a media compression device, a media decompression device, a media filtering device, a media transformation device a media entertainment system, a media display, STB, or any other media processing architecture. The embodiments are not limited in this context.

In various embodiments, for example, the media processing node 102 may perform media processing operations such as encoding and/or compressing of media data into a file that may be stored or streamed, decoding and/or decompressing of media data from a stored file or media stream, media filtering, media playback, internet-based media applications, teleconferencing applications, and streaming media applications. Examples of media filtering may include noise filtering, noise reduction filtering, pixel averaging, median filtering, rank filtering, graphic scaling, deblocking filtering, and so forth. The embodiments are not limited in this context.

In various embodiments, the media processing node 102 may comprise multiple elements, such as elements 102-1-$p$, where p represents any positive integer. Although FIG. 1 shows a limited number of elements by way of example, it can be appreciated that more or less elements may be used for a given implementation. The embodiments are not limited in this context.

Elements 102-1-$p$ may comprise, or be implemented as, one or more systems, sub-systems, processors, devices, machines, components, circuits, registers, modules, applications, programs, subroutines, or any combination thereof, as desired for a given set of design or performance constraints. In various embodiments, elements 102-1-$p$ may be connected by one or more communications media. Communications media generally may comprise any medium capable of carrying information signals. For example, communication media may comprise wired communication media, wireless communication media, or a combination of both, as desired for a given implementation. The terms "connection" or "interconnection," and variations thereof, in this context may refer to physical connections and/or logical connections. The embodiments are not limited in this context.

In various embodiments, the media processing node 102 may comprise a memory element 102-1. The memory element 102-1 may comprise, or be implemented as, any machine-readable or computer-readable media capable of storing data, including both volatile and non-volatile memory. For example, memory 102-1 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 102-1 may be included on the same integrated circuit as processor 102-1, or alternatively some portion or all of memory 102-1 may be disposed on an integrated circuit or other medium, for example a hard disk drive, that is external to the integrated circuit of processor 102-1. The embodiments are not limited in this context.

In various embodiments, the memory element 102-1 may be arranged to store media information, for example. In various implementations, the memory element 102-1 may be arranged to store one or more items of media information, such as one or more pixels of image information. In one embodiment, for example, one or more pixels of image information may be stored as words in memory element 102-1. A pixel generally may comprise multiple bits of information (e.g., 8 bits), and a word may have storage capacity for a certain amount of information (e.g., 32 bits or 4 pixels). Accordingly, in various embodiments, the memory element 102-1 may comprise multiple items of media information in a single word. In some implementations, multiple items of media information (e.g., pixels of image information) may correspond to a horizontal or vertical line of an image. The embodiments are not limited in this context.

In various embodiments, the memory element 102-1 may arrange media information as a two-dimensional (2D) matrix or array having N rows and M columns. Each row and column of a matrix may be arranged to store multiple words, items, and elements. In one example, a matrix may comprise 32 bit rows and 32 bit columns. Accordingly, in this example, media information may be arranged as a 4×4 matrix of 8 bit items. In another example, a matrix may comprise 64 bit rows and 64 bit columns. Accordingly, in this example, media information may be arranged as an 8×8 matrix of 8 bit items and/or as four 4×4 sub-matrices of 8 bit items. Although described above for two dimensions, the concepts and techniques may be applied to three or more dimensions. The embodiments are not limited in this context.

In various embodiments, media information may be arranged as one or more matrices of items (e.g., pixels of image information). For example, media information may be arranged as one or more matrices. Each matrix may, in turn, comprise multiple sub-matrices. For instance, an 8×8 matrix may comprise four 4×4 sub-matrices, and a 32×32 matrix may comprise sixteen 4×4 sub-matrices. It is to be understood that the term "matrix" along with its derivatives may comprise, or be implemented, as any matrix or sub-matrix of any size. The embodiments are not limited in this context.

In various embodiments, media processing node 102 may comprise a processing element 102-2. The processing element 102-2 may comprise, or be implemented as one or more processors capable of providing the speed and functionality desired for an embodiment and may include accompanying architecture. For example, the processing element 102-2 may be implemented as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing element 102-2 may be implemented as a general purpose processor, such as a processor made by Intel® Corporation, Santa Clara, Calif. The processing element 102-2 may also be implemented as a dedicated processor, such as a controller, microcontroller, embedded processor, a digital signal processor (DSP), a network processor, a media processor, an input/output (I/O) processor, and so forth. The embodiments are not limited in this context.

In various embodiments, the processing element 102-2 may comprise, or be implemented as, one or more of a media processing system, a media processing sub-system, a media processor, a media computer, a media device, a media encoder, a media decoder, a media codec, a media compression device, a media decompression device, a media filtering device (e.g., graphic scaling device, deblocking filter, separable 2D filter), a media transform device (e.g., discrete cosine transform device, inverse discrete cosine transform device, fast Fourier transform device, inverse fast Fourier transform device), a media entertainment system, a media display, or any other media processing architecture. In some embodiments, for example, the processing element 102-2 may be implemented as a media processor. Although some embodiments may describe the processing element 102-2 as a media processor 102-2, it may be appreciated that the processing element 102-2 may be implemented using any of the various examples as previously described. The embodiments are not limited in this context.

In various embodiments, the media processor 102-2 may be arranged to process media information, for example. In various implementations, the media processor 102-2 may be arranged to process one or more items of media information, such as one or more pixels of image information. In one embodiment, for example, the media processor 102-2 may perform processing operations on a matrix of media information, such as pixels of image information. The processing operations may be performed in a horizontal direction and in a vertical direction of the matrix.

In various implementations, the processing operations may include filtering information, such as media information. For example, various embodiments may be directed to filtering techniques to reduce noise in an image. Such media information may be subject to noise from a number of different sources. Noise may be introduced during media capture operations, media processing operations such as media encoding and/or compression, media transmission operations, media storage operations, and so forth. For example, media information may be compressed in accordance with a number of different video compression standards, such as the ITU H.261/H.263/H.264 series of standards, the ISO Motion Picture Experts Group (MPEG) 1/MPEG-2/MPEG-4 series of standards, and so forth. Media compression attempts to reduce the number of information bits needed to represent image content with a corresponding loss in image quality. The major phases of media compression may include motion estimation, motion compensation, transform, quantization and entropy encoding. The phase of quantization is a lossy process of reducing the data bit rate to meet the bandwidth requirements of an application at the cost of quality. The information loss during quantization operations is typically unrecoverable and introduces coding artifacts. This and other information loss during compression operations may sometimes be referred to as "coding noise."

In some embodiments, the media processing node 102 may be arranged to reduce noise (e.g., coding noise) in an image using a number of filtering techniques. In one embodiment, for example, the media processing node 102 may be arranged to perform horizontal and/or vertical filtering for a P×Q pixel matrix of a frame, where P×Q represents any positive integer (e.g., 3×3, 4×4, and so forth). The embodiments are not limited in this context.

In some embodiments, the media processing node 102 may be arranged to detect and reduce Gaussian noise in a video, picture or image. Gaussian noise may refer to noise in a signal with a normal distribution. The artifact caused by Gaussian noise is undesirable. Noise filtering may be used to reduce the artifact as part of post-processing filtering in order to improve image quality. Noise filtering techniques, however, may blur the high-detailed content of an image as well. Consequently, noise filtering should only be applied to an image if noise is present the image. Accordingly, some embodiments may implement noise detection techniques prior to performing noise filtering. The noise detection techniques may detect Gaussian noise within an image, and the strength or intensity of the noise within the image.

Conventional techniques to detect Gaussian noise may be unsatisfactory for a number of reasons. For example, one technique to detect Gaussian noise may use non-active video areas to measure an amount of noise in an image given the assumption that the signal perturbation in these areas should come from the noise only. The non-active video areas may include control information such as blanking lines, text lines, and so forth. Non-active video areas, however, could be inserted or cleaned during an earlier stage of the video process. In another example, a motion detection approach may be used to detect Gaussian noise. The motion detection approach is based on the concept that when an area that should have minimal motion detection output is different from the same area in a different temporal image, the temporal difference may represent noise. Motion detection techniques, however, may suffer from the lack of reliable motion detection information during scene changes. Further, motion detection techniques may be expensive in terms of the number of required computations and memory complexities needed to implement such motion detection techniques.

Some embodiments may solve these and other problems. In one embodiment, for example, the media processing node 102 may be arranged to detect and reduce Gaussian noise in a video, picture or image. The media processing node 102 may estimate noise for an image using spatial information derived from active regions of the image. Compared to temporal approaches such as motion detection techniques, the use of spatial information may improve noise detection during scene changes. In addition, the use of spatial information may be less expensive to implement since it obviates the need for temporal latency. By improving detection techniques to detect Gaussian noise within an image, a Gaussian noise filter may be intelligently adapted to filter the detected noise, thereby achieving improved image quality.

In some embodiments, for example, the media processing node 102 may enhance the quality of an image by detecting the Gaussian noise pattern using a single image, and then applying intelligent noise filtering to achieve improved noise reduction for the image. The media processing node 102 may provide a per-pixel based noise metric to assess a local signal perturbation in order to estimate the local noise intensity. The media processing node 102 may model the noise metric based on a block of pixels to estimate the noise corruption of certain regions of the image. The media processing node 102 may use a statistical technique such as a cumulative distribution function (CDF) of the per-block noise metric to detect the presence of noise. The media processing node 102 may model the intensity of any detected noise using the CDF statistic of the per-block metric. The media processing node 102 may formulize an operating point from the CDF of the per-block noise metric to assess the noise occurrence. The media processing node 102 may use the operating point to classify the image into one of a number of categories with various granularities, such as a noise free image, almost noise free image, nearly noisy image and noisy image, for example. The media processing node 102 may perform such classification in accordance with the statistic derived from the CDF of the per-block noise metric. The media processing node 102 may select a set of filter parameters based on the classification for the image, and filter the image using the filter parameters.

In one embodiment, for example, the media processor 102-2 of media processing node 102 may include an image signal processor (ISP) having multiple processing elements. One or more ISP may be arranged to determine a level of noise for an image using an internal spatial region of the image, select filter parameters based on the level of noise, and filter the image using the filter parameters. Media processing node 102 in general, and media processor 102-2 in particular, may be described in more detail with reference to FIG. 2.

Figure 2:
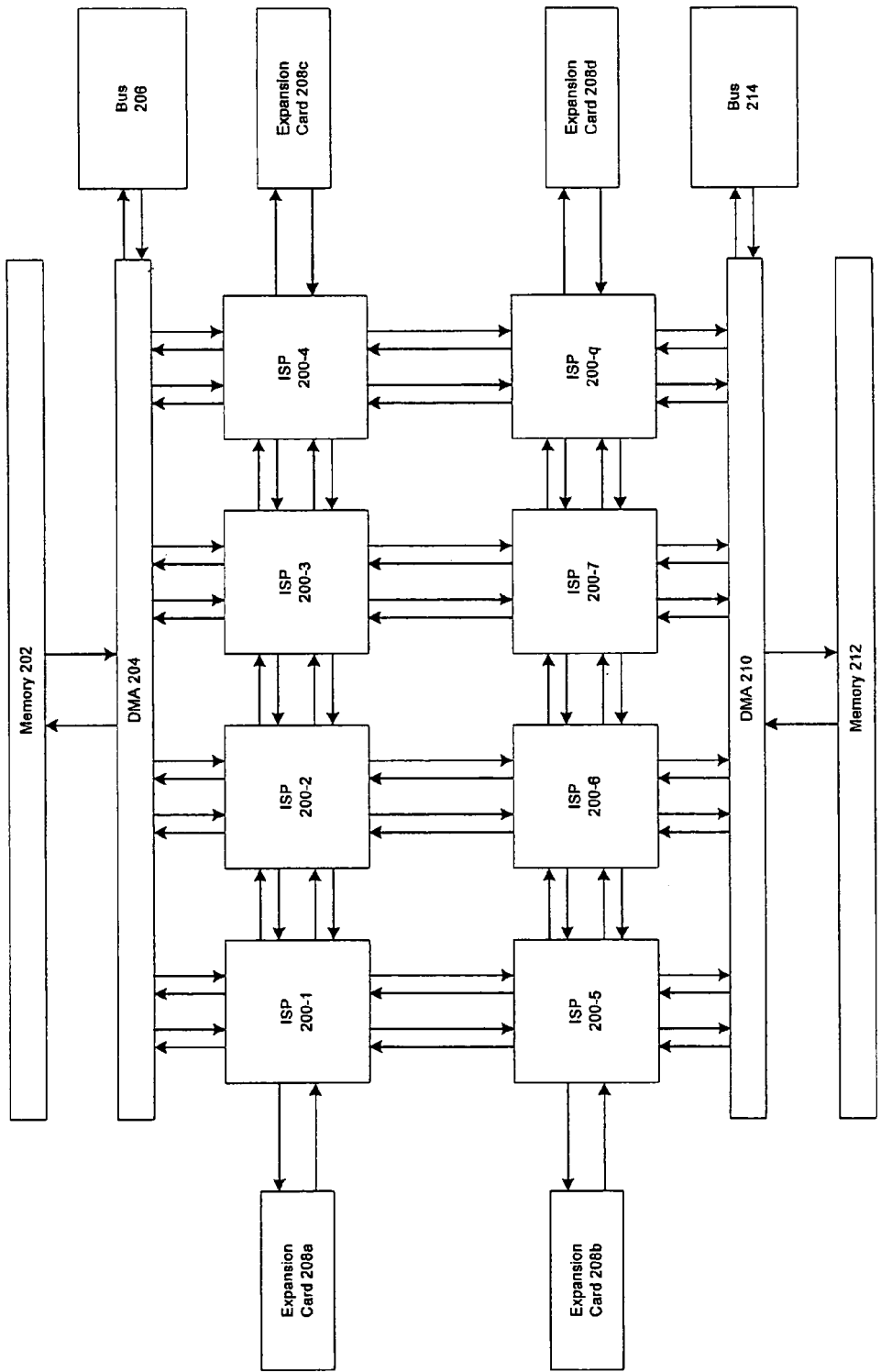
FIG. 2 illustrates one embodiment of a media processor.

FIG. 2 illustrates one embodiment of a media processor. The media processor 102-2 may perform various media processing operations for media processing node 102. Although FIG. 2 shows a limited number of elements for the media processor 102-2 by way of example, it can be appreciated that more or less elements may be used in media processor 102-2 as desired for a given implementation. The embodiments are not limited in this context.

In one embodiment, the media processor 102-2 may be implemented as a multiple instruction streams, multiple data streams (MIMD) processor arranged to operate in accordance with a single instruction stream, multiple data streams (SIMD) instruction set. Examples for the media processor 102-2 may include a media processor from a series of media processors made by Intel Corporation, such as an MXP5800 Digital Media Processor, an MXP5400 Digital Media Processor, and so forth. In one embodiment, for example, the media processor 102-2 may be implemented using an MXP5800. The embodiments, however, are not limited in this context.

The media processor 102-2 may include multiple image signal processors (ISP) 200-1-$q$. In one embodiment, for example, the media processor 102-2 may include eight ISP 200-1-8 coupled to each other via programmable ports (e.g., quad ports). The quad ports may form a mesh-connected grid to flexibly route data among the ISP 200-1-$q$. Each ISP 200-1-$q$ may have five 16-bit arithmetic logic units (ALU) with dual MAC units, totaling 40 ALU units and 16 MAC units for the entire media processor 102-2. Although media processor 102-2 is shown in FIG. 2 with eight ISP 200-1-8, it may be appreciated that any number of ISP may be used as desired for a given implementation. The embodiments are not limited in this context.

In addition, the quad ports may couple the ISP 200-1-$q$ to other elements. For example, the quad ports may couple ISP 200-1-$q$ to various memory units, such as memory units 202, 212. Memory units 202, 212 may comprise, for example, dual data rate (DDR) SDRAM memory units including DDR 266× 16 interfaces. The quad ports may also couple the ISP 200-1-$q$ to direct memory access (DMA) units 204, 210. Each DMA unit 204, 210 may include an 18 channel DMA interface, thereby providing 36 channels to support memory units 202, 212. DMA units 204, 210 may be connected to buses 206, 214. Buses 206, 214 may comprise, for example, peripheral component interconnect (PCI) buses. In one embodiment, for example, the PCI buses 206, 214 may comprise 32-bit buses operating at 66 MHz. The embodiments are not limited in this context.

In general operation, the media processor 102-2 may receive an input stream of pixel values and perform various image processing operations on the pixel stream using one or more of the ISP 200-1-$q$. For example, the media processor 102-2 may perform noise reduction filtering using one or more of the ISP 200-1-$q$. An example of an ISP 200-1-$q$ suitable for use with the media processor 102-2 may be described in more detail with reference to FIG. 3.

Figure 3:
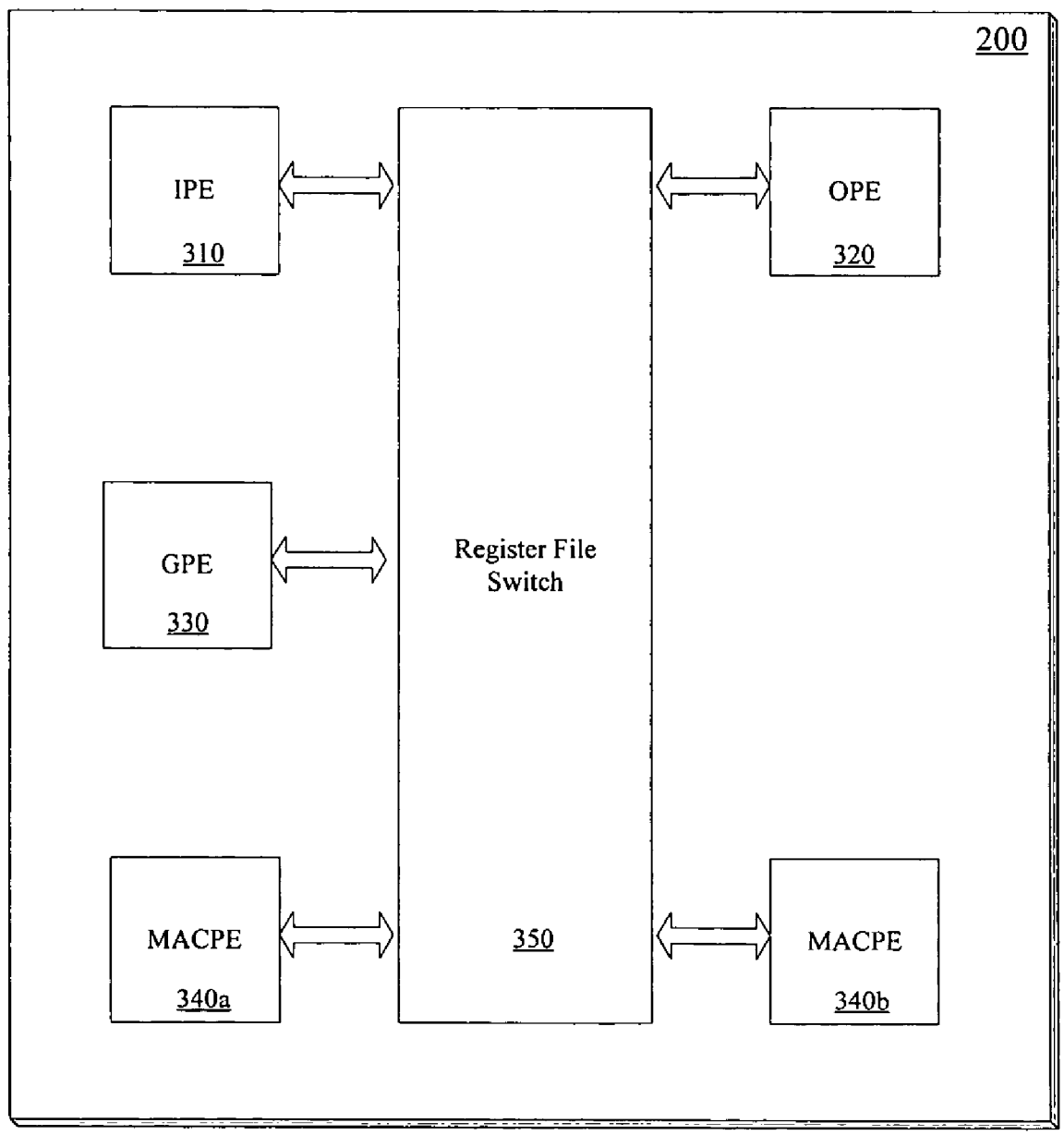
FIG. 3 illustrates one embodiment of an image signal processor.

FIG. 3 illustrates one embodiment of an ISP. FIG. 3 may illustrate an ISP 200 from ISP 200-1-$q$. The ISP 200 may include multiple processing elements (PE) coupled to a register file switch 350. In particular the multiple PE may include an input PE (IPE) 310, an output PE (OPE) 320, a general purpose PE (GPE) 330, and two multiply-accumulate PE (MACPE) 340a and 340b. Register file switch 350 provides a fast and efficient interconnect mechanism between the various PE.

In one embodiment, individual threads are mapped to the PE in such a way as to minimize the communication overhead. In a further embodiment, the programming model of ISP 200 is such that each PE implements a part of an algorithm and data flows from one PE to another and from one ISP to another in a pipeline manner until the data is completely processed.

According to one embodiment, each PE uses a data driven technique to process data. In a data driven technique, each piece of data in the system has a set of Data Valid (DV) bits that indicate for which PE the data is intended. Thus, if a register data is intended for two PE (e.g., GPE 330 and MACPE 340), the DV bits 0 and 1 of the register is set. If GPE 330 no longer needs the data, then it resets the DV bit.

When the DV bits for all of the consumer PE in a register are reset, the producer PE can go ahead and write new data into the register with a new set of DV bit settings. Otherwise, the producer PE is stalled until the various consumer PE have reset their respective DV bits. Similarly, if a PE attempts to read a piece of data from a register and if its DV bit is not set, the PE stalls until there is a data with DV bit corresponding to the consumer PE set. This technique allows the various PE to share and use the registers, while potentially reducing the complexity of the user-programming model.

In one embodiment, the IPE 310 is coupled to quad ports to receive input data streams and to route the data to other PE within the ISP 200. The OPE 320 is coupled to the quad ports to transmit outgoing data streams (e.g., to an adjacent ISP 200-1-*q*) once the data has been processed at the ISP 200. The GPE 330 is a basic PE upon which the other PE may be constructed. The MACPE 340*a-b* performs mathematical operations, such as multiply and accumulate operations, for a particular ISP 200. Although not shown in FIG. 3, each PE may also include a multitude of local registers (LR) and indirect registers (IR). The embodiments are not limited in this context.

According to one embodiment, one or more of the various PE within the ISP 200 may be arranged to perform Gaussian noise reduction filtering operations. For example, the various PE of the ISP 200 may be arranged to perform Gaussian noise detection. In some embodiments, the ISP 200 may determine a per-pixel noise metric (NMP) for multiple blocks to assess the local signal perturbation. The ISP 200 may use the minimum NMP value within a given block to represent the noise metric for each block (NMB). The ISP 200 may use the NMB value to estimate noise corruption of a localized area. The ISP 200 may collect a statistical value using the NMB values of each block located within an internal spatial region of the image, and calculate a CDF value of the NMB per image. The ISP 200 may use a pre-defined percentile value to work out an operating point to assess the statistic in order to determine whether the image contains any noise. The ISP 200 may then estimate a level of noise within the image, determine a set of filter parameters in accordance with the estimated level of noise, and provide the filter parameters for a companion Gaussian noise filter to reduce the noise artifact.

Operations for the system 100, the media processor 102-2, and/or the ISP 200 may be further described with reference to the following figures and accompanying examples. Some of the figures may include logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
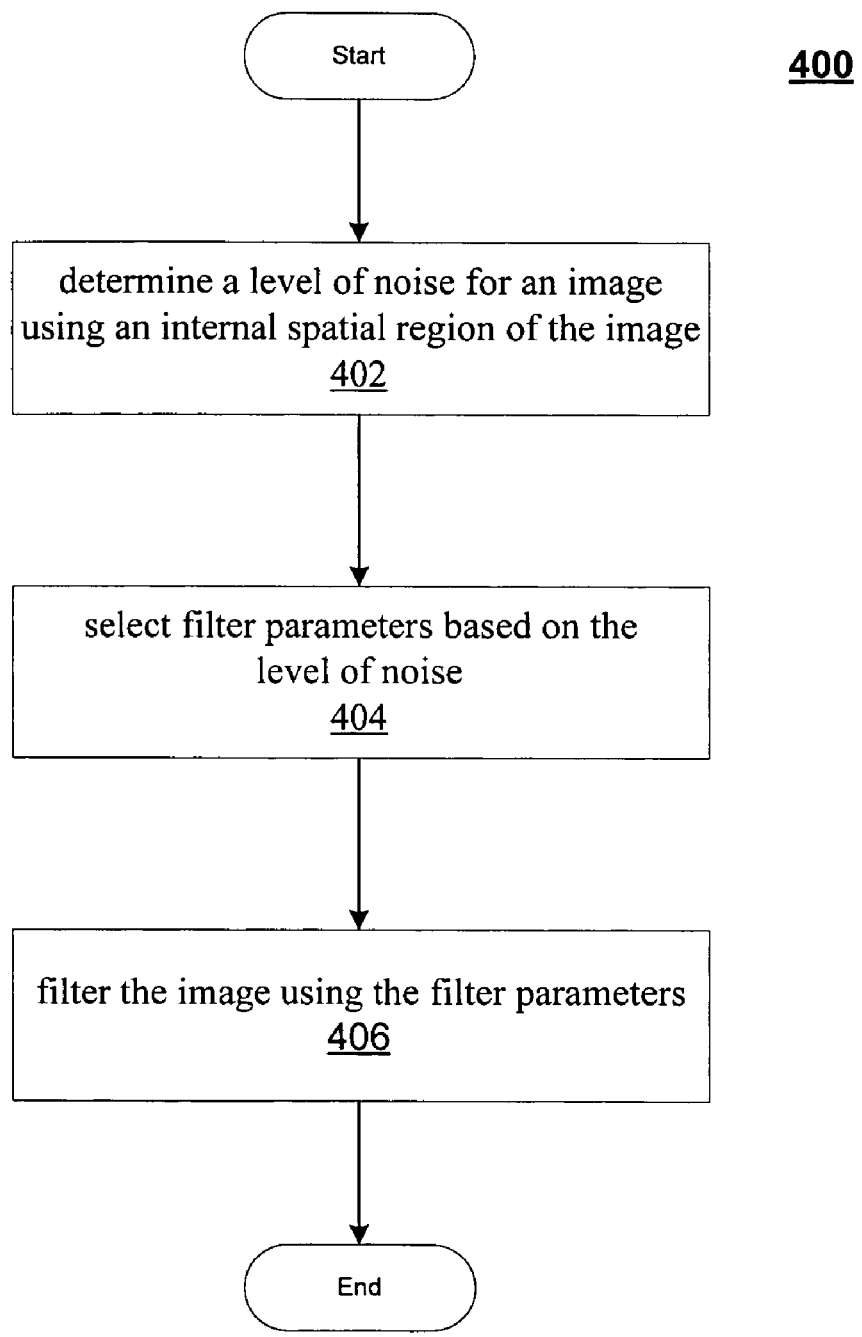
FIG. 4 illustrates one embodiment of a logic flow.

FIG. 4 illustrates one embodiment of a logic diagram. FIG. 4 illustrates a logic flow 400. The logic flow 400 may be representative of the operations executed by one or more structure described herein, such as an ISP 200 of the media processor 102-2. More particularly, the logic flow 400 may be representative of the operations executed by the ISP 200 to perform noise reduction filtering. As shown in FIG. 4, a level of noise for an image may be determined using an internal spatial region of the image at block 402. A set of filter parameters may be selected based on the level of noise at block 404. The image may be filtered using the filter parameters at block 406.

In one embodiment, the internal spatial region may comprise active content for an image. Active content may refer to media information within an image. Examples of active content may generally include media information used to generate an image perceptible by the human vision system (HVS). By way of contrast, non-active content may refer to control information within an image, such as blanking lines. The embodiments are not limited in this context.

In one embodiment, a level of noise for an image may be determined using an internal spatial region of the image. For example, the selected internal spatial region may be defined into a set of blocks. The blocks may be scanned and processed in sequence. A NMP value may be determined for each pixel within a block. A NMB value may be determined for each block using the NMP values. A CDF value may be determined for the blocks using the NMB values. An operating point value may be selected using the CDF value. In one embodiment, the operating point value may be selected using the CDF value and a predetermined percentile value of the CDF value. The operating point value may be compared to one or more predetermined threshold values. The level of noise for the image may be determined in accordance with the comparison.

In one embodiment, once the level of noise for an image has been determined, a set of filter parameters may be selected based on the level of noise. The image may then be intelligently filtered using the filter parameters.

The operation of the above described embodiments may be better understood by way of example. Assume the media processor 102-2 receives a stream of media information comprising pixel values for a series of video images. The media processor 102-2 may filter the stream of media information using one of a number of noise reduction filters. In one embodiment, for example, the various PE of the ISP 200 of the media processor 102-2 may be arranged to determine a level of noise for an image may be determined using an internal spatial region of the image.

In one embodiment, for example, the selected internal spatial region may be defined into a set of blocks. The blocks may be scanned and processed in accordance with a given block scanning pattern. The size of the blocks may vary in accordance with the design constraints for a given implementation. In one embodiment, for example, the blocks may be scanned in as 8×8 pixel matrices. In one embodiment, for example, the actual buffer size may be (M+1)*(N+1) due to the 3×3 neighborhood consideration involved in the NMP which will be further described later. The embodiments are not limited in this context.

Figure 5:
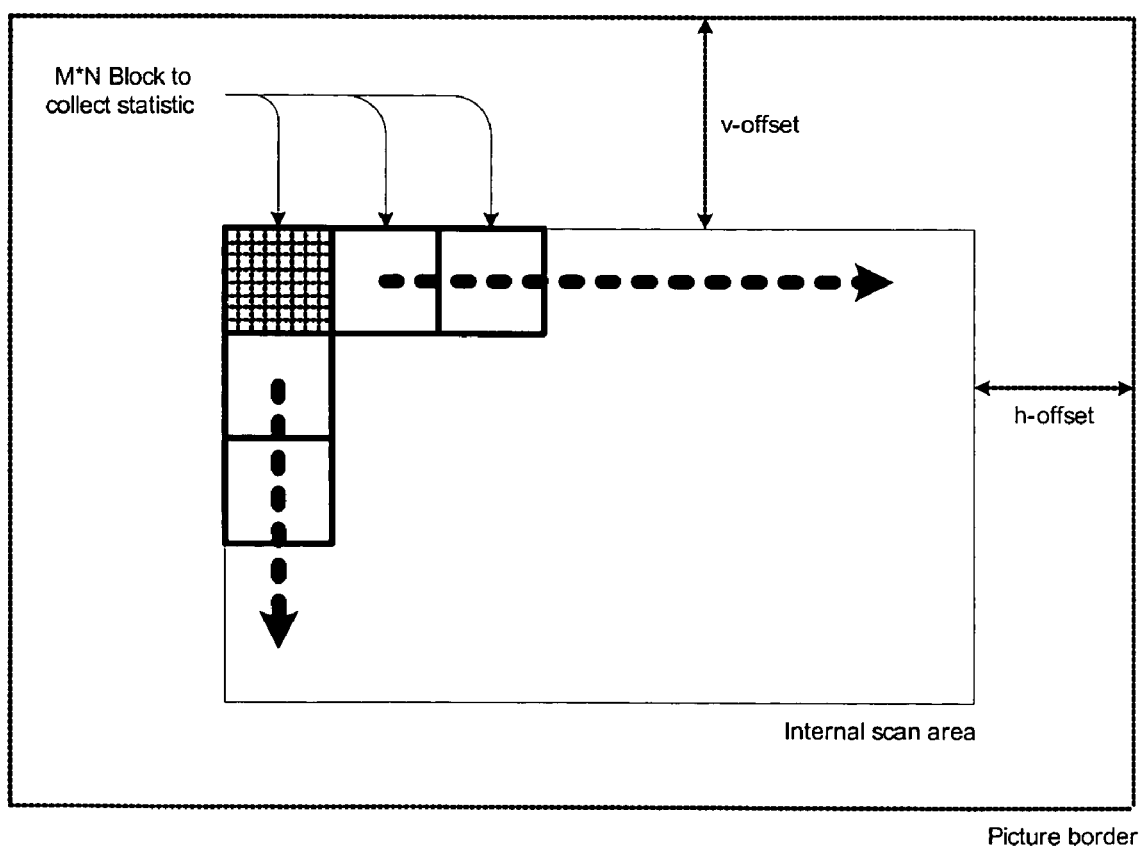
FIG. 5 illustrates one embodiment of a scanning diagram.

FIG. 5 illustrates one embodiment of a scanning diagram. FIG. 5 may illustrate a scanning diagram 500. In order to reduce the probability of using erroneous statistical information derived from non-active areas of an image, such as blanking lines and text regions, the media processor 102-2 may collect media information from an internal spatial region of the image. The internal spatial region may be defined using a vertical offset (v-offset) parameter and a horizontal offset (h-offset) parameter for the image. The internal spatial region may be separated into multiple blocks, and the media processor 102-2 may process the blocks in accordance with a given scanning order, pattern or sequence. For example, the media processor 102-2 may begin scanning the blocks by row in a horizontal direction from a left side of the internal spatial region to a right side of the internal spatial region, continuing in a vertical direction from a top of the internal spatial region to a bottom of the internal spatial region for each row in the internal spatial region. It may be appreciated that although some embodiments may be described using particular block sizes and scanning patterns, other block sizes and scanning patterns may also be used as desired for given set of design constraints. The embodiments are not limited in this context.

In one embodiment, a NMP value may be determined for each pixel within a block. In one embodiment, for example, the NMP value may be determined using a pixel averaging technique. Pixel averaging techniques may determine an average from a set of reference pixels in a filter support which is usually in the spatial neighborhood of a target pixel. An example of such pixel averaging filtering techniques may include median or rank filtering (collectively referred to herein as "median filtering") on pixels of image information. The embodiment, however, are not limited in this context.

In one embodiment, for example, a 3×3 pixel matrix may be used. Assume for a target pixel x a neighborhood of x denoted as Neighbor(x). Further assume the noise is spatially uniform within the Neighbor(x) and the median of Neighbor (x) is considered a noise free pixel of the Neighbor(x), denoted herein as median(x). In order to extract the noise, the noise metric NMP value may be defined as the summation of the absolute difference between median(x) and every pixel within Neighbor(x).

In one embodiment, a NMB value may be determined for each block using the NMP values. Since Gaussian noise is a random process, there is no fixed pattern to be predicted from reading the pixel values. For example, sometimes the Gaussian noisy pixels and the texture pixels are inseparable. That is, some texture pixels and Gaussian noise pixels have exactly the same statistical characteristics relative to a local neighborhood, and therefore it may be difficult to separate them into different classes. If the area of consideration is homogeneous (e.g., a flat area), however, then the local pixel perturbation is likely to represent noise. Accordingly, the NMB value may be defined as the minimum value of the NMP values for all the pixels within the block, as denoted by Equation (1) as follows:

$$NMB(b) = \text{minimum}\{NM(x) | x \in b\} \quad (1)$$

where b is a block within the internal area of the picture. The minimum criterion facilitates collecting the statistic from a homogeneous area within the block. In one embodiment, the block size may be implemented as an 8×8 pixel matrix. This block size may represent an acceptable tradeoff between cost and performance, and potentially allows a flexible number of hardware implementations. The embodiments, however, are not limited in this context.

In one embodiment, a CDF value may be determined for the blocks using the NMB values. For each image, a CDF of the NMB may be sampled for all the blocks within the internal area of the image. Let Y be a random variable defined on a sample space S, in this example {NMB(b)}, with a probability function P. For any integer value y, the CDF of Y denoted as F(y) is the probability associated with a set of sample points in S that is mapped by Y into values less than or equal to y, as denoted in Equation (2) as follows:

$$F(y) = P(\{s \in S | Y(s) \leq y\}) \quad (2)$$

Figure 6B:
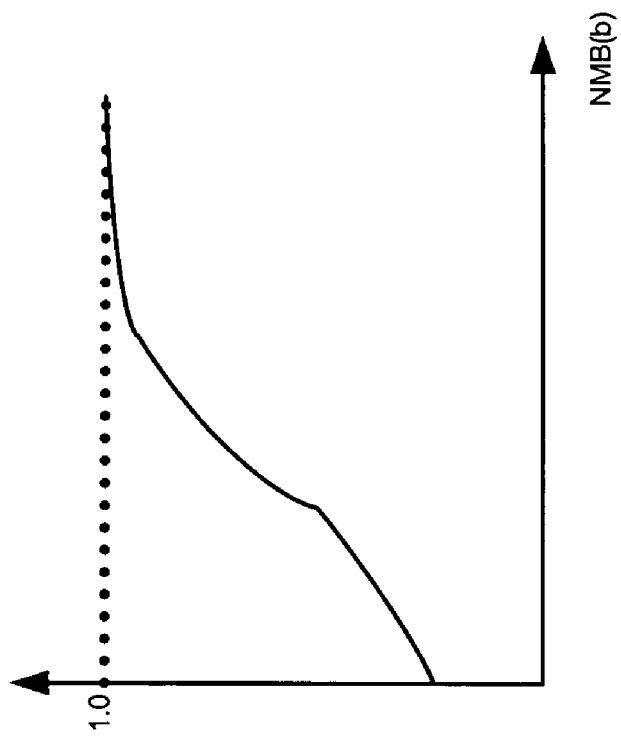
FIG. 6B illustrates one embodiment of a second cumulative distribution function.
Figure 6A:
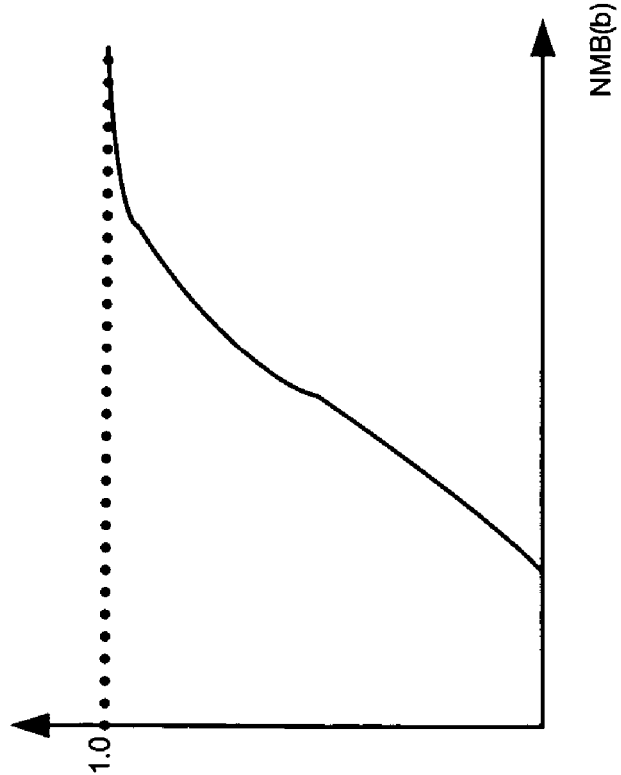
FIG. 6A illustrates one embodiment of a first cumulative distribution function graph.

FIGS. 6A and 6B illustrate embodiments of CDF graphs. FIGS. 6A and 6B illustrate CDF graphs 602 and 604, respectively. Graph 602 may illustrate a trend in CDF values for images with noise. Graph 604 may illustrate a trend in CDF values for images with noise. As shown in FIG. 6A, there is typically a fewer number of small-value NMB blocks for images with noise. As shown in FIG. 6B, however, there is typically a greater number of small-value NMB blocks for images without noise. This distinction in statistical behavior may be used to detect the presence and intensity of noise within an image.

In one embodiment, an operating point value may be selected using the CDF value. The operating point may be used to assess noise characteristics from the sampled statistics of real-time video. Studies have indicated that a good result may occur when the operating point is set at a low percentile point of the CDF of the NMB value. For example, assume a k-percentile (kp) of the CDF of the NMB is defined to satisfy Equation (3) as follows:

$$\{Pr\, ob(NMB(b) \geq y) \geq k*100\%\} \text{ AND } \{Pr\, ob(NMB(b) > y) < k*100\%\} \quad (3)$$

where AND represents the logic AND condition. Selection of the operating point using the predefined kp may be described in more detail with reference to FIG. 7.

Figure 7:
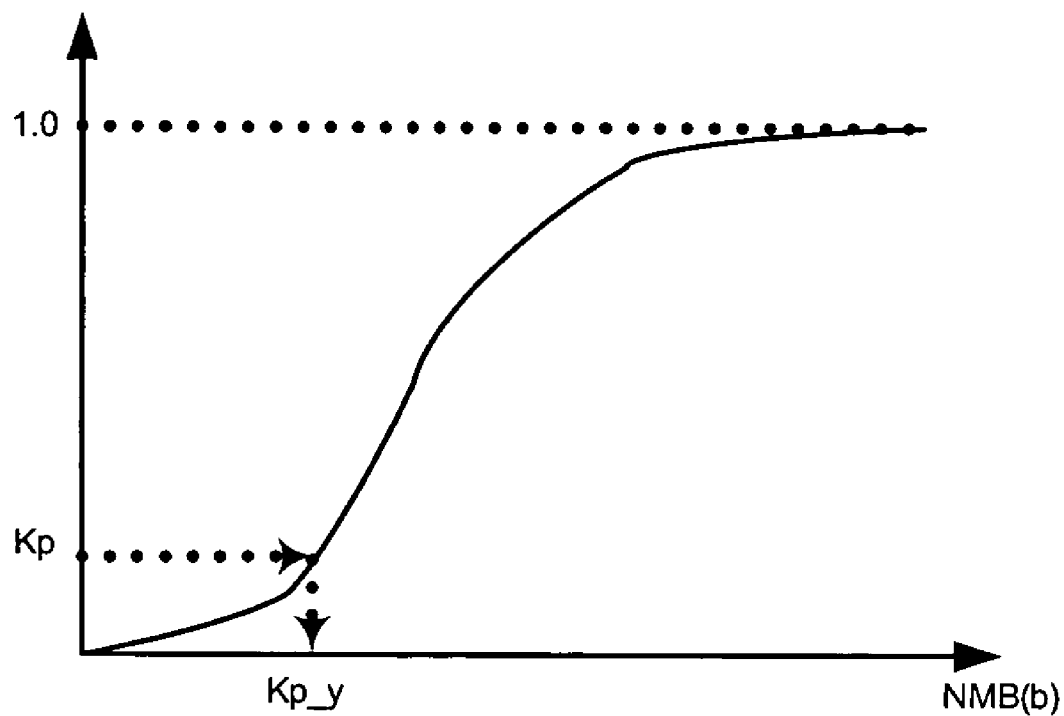
FIG. 7 illustrates one embodiment of an operating point graph.

FIG. 7 illustrates one embodiment of an operating point graph. FIG. 7 illustrates an operating graph 700. Operating graph 700 may illustrate a trend in CDF values. The trend may be used to select an associated NMB value appropriate for use as an operating point. As shown in operating graph 700, a relatively low predefined kp derived using Equation (3) may be used to derive an associated NMB value denoted as kp_y. In one embodiment, the kp_y value may represent the operating point. The embodiments are not limited in this context.

In one embodiment, the kp_y value may be compared to one or more predetermined threshold values to derive the image type of the video with respect to the intensity of the noise in the image. The comparison operations may be described in more detail with reference to FIG. 8.

Figure 8:
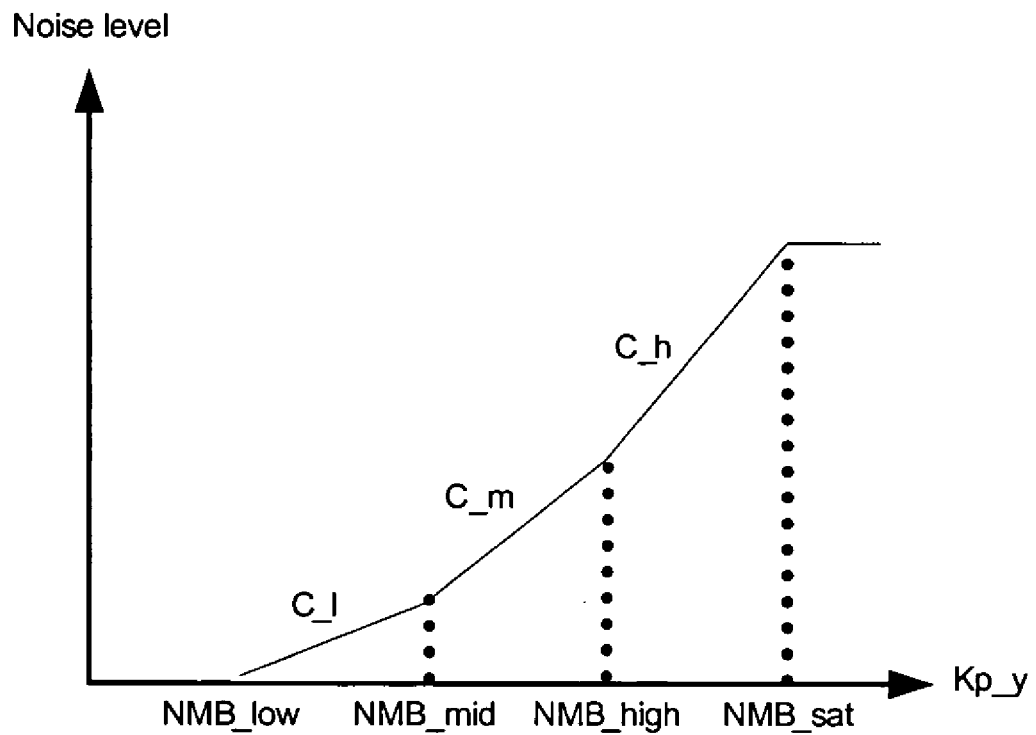
FIG. 8 illustrates one embodiment of a detection graph.

FIG. 8 illustrates one embodiment of a detection graph. FIG. 8 illustrates a detection graph 800. Detection graph 800 may illustrate the mapping of the operating point value kp_y and various detected noise levels of Gaussian noise. As shown in detection graph 800, multiple control points may be used to assess one or more characteristics of a video on an image-by-image basis using the CDF value of the NMB value. In one embodiment, for example, three control points may be used, with the three control points denoted as NMB_low, NMB_mid and NMB_high. The derived kp_y may be compared to the multiple control points, and a set of decision rules may be implemented to classify the image into various categories. In one embodiment, for example, the decision rules may classify the image into the following four categories:

$$\begin{cases} \text{if } (kp\_y \leq NMB\_low) => \text{noise free picture} \\ \text{else if}(kp\_y < NMB\_mid) => \text{almost noise free picture} \\ \text{else if}(kp\_y < NMB\_high) => \text{nearly noisy picture} \\ \text{else } => \text{noisy picture} \end{cases}$$

It may be appreciated that any number of control points, categories and decision rules may be implemented as desired for a given set of design constraints. The embodiments are not limited in this context.

Once the level of noise for an image has been determined, a set of filter parameters may be selected based on the level of noise. In order to properly reduce the noise, an accurate estimate of the intensity of the noise source should be derived. For example, the derived kp_y value may be used to estimate the noise intensity. The exact model of kp_y and gaussian_th may be relatively complex. In one embodiment, a piecewise linear mapping between kp_y and noise level may be used. Studies have indicated that desirable performance may be accomplished when the mapped noise level is used as the filter parameter to filter the image. As shown in FIG. 8, the mapping is controlled by the NMB_low, NMB_mid, NMB_high, and the slopes of C_l, C_m, and C_h. A saturation point (NMB_sat) may be used to cap the maximum gaussian_th value for images with unusually severe noise.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

In the description and claims, the terms coupled and connected, along with their derivatives, may be used. In particular embodiments, connected may be used to indicate that two or more elements are in direct physical or electrical contact with each other. Coupled may also mean that two or more elements are in direct physical or electrical contact. Coupled may also mean, however, that two or more elements may not be in direct contact with each other, but yet may still cooperate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Some embodiments may have been described in terms of algorithms and symbolic representations of operations on data bits or binary digital signals within a computer memory. It may be appreciated that these algorithmic descriptions and representations may be the techniques used by those skilled in the data processing arts to convey the substance of their work to others skilled in the art. An algorithm may be considered a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the above discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a media processor including an image signal processor having multiple processing elements to:
determine a level of noise for an image using an internal spatial region of said image by scanning blocks of said internal spatial region, determining a pixel noise metric value for each pixel within a block, determining a block noise metric value for each block using said pixel noise metric values, and determining a cumulative distribution function value for said blocks using said block noise metric values,
select filter parameters based on said level of noise, and
filter said image using said filter parameters.

2. The apparatus of claim 1, wherein said media processor comprises a multiple instruction streams, multiple data streams processor.

3. The apparatus of claim 1, wherein said image signal processor comprises:
an input processing engine;
an output processing engine;
a general purpose processing engine;
a first multiply and accumulate processing engine;
a second multiply and accumulate processing engine; and
a register file switch to couple to said processing engines.

4. The apparatus of claim 1, said media processor to select an operating point value using said cumulative distribution function value, compare said operating point value to one or more predetermined threshold values, and determine said level of noise for said image in accordance with said comparison.

5. A system, comprising:
a media source node to generate a stream of pixel values;
a media processing system to couple to said media source node, said media processing system to comprise:
a memory to store said pixel values; and
a media processor to couple to said memory, said media processor including an image signal processor having multiple processing elements to:
determine a level of noise for an image using an internal spatial region of said image by scanning blocks of said internal spatial region, determining a pixel noise metric value for each pixel within a block, determining a block noise metric value for each block using said pixel noise metric values, and determining a cumulative distribution function value for said blocks using said block noise metric values,
select filter parameters based on said level of noise, and
filter said image using said filter parameters.

6. The system of claim 5, wherein said media processor comprises a multiple instruction streams, multiple data streams processor.

7. The system of claim 5, wherein said image signal processor comprises:
an input processing engine;
an output processing engine;
a general purpose processing engine;
a first multiply and accumulate processing engine;
a second multiply and accumulate processing engine; and
a register file switch to couple to said processing engines.

8. The system of claim 5, said media processor to select an operating point value using said cumulative distribution function value, compare said operating point value to one or more predetermined threshold values, and determine said level of noise for said image in accordance with said comparison.

9. A computer-implemented method to filter an image, comprising:
determining a level of noise for an image with an image signal processor having multiple processing elements, using an internal spatial region of said image by:
scanning blocks of said internal spatial region;
determining a pixel noise metric value for each pixel within a block;
determining a block noise metric value for each block using said pixel noise metric values; and
determining a cumulative distribution function value for said blocks using said block noise metric values;
selecting filter parameters based on said level of noise; and
filtering said image using said filter parameters.

10. The method of claim 9, said internal spatial region comprising active content.

11. The method of claim 9, comprising:
selecting an operating point value using said cumulative distribution function value;
comparing said operating point value to one or more predetermined threshold values; and
determining said level of noise for said image in accordance with said comparison.

12. The method of claim 11, comprising selecting said operating point value using said cumulative distribution value and a predetermined percentile value of said cumulative distribution value.

13. An article comprising a machine-readable storage medium containing instructions that if executed by a machine enable the machine to:
determine a level of noise for an image using an internal spatial region of said image, including instructions that enable the machine to: scan blocks of said internal spatial region, determine a pixel noise metric value for each pixel within a block, determine a block noise metric value for each block using said pixel noise metric values, and determine a cumulative distribution function value for said blocks using said block noise metric values,
select filter parameters based on said level of noise, and
filter said image using said filter parameters.

14. The article of claim 13, said internal spatial region comprising active content.

15. The article of claim 13, further comprising instructions that if executed enable the system to select an operating point value using said cumulative distribution function value, compare said operating point value to one or more predetermined threshold values, and determine said level of noise for said image in accordance with said comparison.

16. The article of claim 15, further comprising instructions that if executed enable the system to select said operating point value using said cumulative distribution value and a predetermined percentile value of said cumulative distribution value.

* * * * *